United States Patent [19]

Horning

[11] Patent Number: 4,895,455

[45] Date of Patent: Jan. 23, 1990

[54] COVER FOR WALL MOUNTED THERMOSTAT INCLUDING ILLUMINATION MEANS AND MAGNIFYING MEANS

[76] Inventor: David Horning, 105 Glen Haven La., Pittsburgh, Pa. 15238

[21] Appl. No.: 319,091

[22] Filed: Mar. 6, 1989

[51] Int. Cl.$^4$ .......................... G01K 1/06; G01D 11/28
[52] U.S. Cl. ..................................... 374/208; D10/51; 116/310; 116/304; 116/DIG. 39; 116/DIG. 36; 350/114; 362/29
[58] Field of Search ............... 374/191, 206, 208, 210; 116/304, 305, 310, DIG. 39, DIG. 36; 337/374; 350/110, 114; 362/23, 24, 29, 30; D10/50, 51, 60, 49; 40/553, 574; 74/553; 200/314, 317

[56] References Cited

U.S. PATENT DOCUMENTS

| | | | |
|---|---|---|---|
| D. 190,050 | 4/1961 | Duncan | D10/51 |
| D. 288,670 | 3/1987 | Steiner | D10/50 |
| 1,610,252 | 12/1926 | Browne | 350/115 |
| 1,701,028 | 2/1929 | Buckingham | 116/304 |
| 1,765,445 | 6/1930 | Porter | 362/24 |
| 2,107,720 | 2/1938 | Swander | 220/82 A |
| 2,117,741 | 5/1938 | McWeeny | 227/109 |
| 2,206,437 | 7/1940 | Tracy | 73/431 |
| 2,460,051 | 1/1948 | Welch | 374/191 |
| 2,571,649 | 10/1951 | Arthur | 74/553 |
| 2,589,963 | 3/1952 | Kenosian | 222/79 |
| 2,729,719 | 1/1956 | Kronmiller | 337/373 |
| 2,812,422 | 11/1957 | Provi | 177/177 |
| 2,901,577 | 8/1959 | Drummond et al. | 337/374 |
| 3,009,051 | 11/1961 | Bittrolff | 362/23 |
| 3,254,534 | 6/1966 | Graham | 374/206 |
| 3,510,196 | 5/1970 | Beer et al. | 350/114 |
| 4,197,726 | 4/1980 | Uyeda | 70/332 |

FOREIGN PATENT DOCUMENTS 459647  1/1937  United Kingdom .............. 200/314

OTHER PUBLICATIONS

Brookstone Catalog-Spring 1988-p. 3.

Primary Examiner—William A. Cuchlinski, Jr.
Assistant Examiner—W. Morris Worth
Attorney, Agent, or Firm—Harry B. Keck

[57] ABSTRACT

A replacement cover is provided for a wall mounted, circular thermostat. The replacement cover engages the rotatable sub-assembly of a wall mounted, circular thermostat and provides a transparent convex lens for enlarging the appearance of temperature indications. In a preferred embodiment a lamp is mounted in the replacement cover to illuminate the temperature indications for easier reading. The lighting circuit includes a battery, a lamp bulb and a normally open switch which can be closed by the operator/viewer of the thermostat.

8 Claims, 2 Drawing Sheets

COVER FOR WALL MOUNTED THERMOSTAT INCLUDING ILLUMINATION MEANS AND MAGNIFYING MEANS

BACKGROUND OF THE INVENTION

1. Field of the Invention

This invention relates to a replacement cover for use with a wall mounted thermostat and includes illuminating means for the thermostat dials and magnifying means to enlarge the view of the thermostat dials.

2. Statement of the Prior Art

Wall mounted thermostats are commonplace, particularly in residential buildings and small office buildings. Such thermostats are generally circular or rectangular in shape. The circular shaped thermostat devices include a wall mounted base and a rotatable sub-assembly which is secured to the wall mounted base and which carries a centrally positioned dial having indicator readings for the existing temperature and having indicator readings for the temperature at which the thermostat is "set". A cover is provided having a transparent opening through which the indicator readings may be viewed.

One of the shortcomings of the existing wall mounted, circular thermostats is that the indicator readings are frequently difficult to observe—particularly for elderly operators whose vision lacks the acuity of youth, and particularly for wall mounted, circular thermostats which are located in poorly lighted halls or rooms. Such thermostats are frequently inspected and frequently reset. It is commonplace to lower the thermostat setting at nighttime and during periods when the thermostat-controlled living space is unoccupied. The thermostat settings are increased during the daytime and early evening when the thermostat-controlled living space is occupied.

A transparent convex magnifier lens with mounting elements has been sold to be attached to the existing cover of a circular thermostat. This device provides visual magnification but does not resolve the problems of thermostats which are mounted in poorly-lighted locations. Also, the available add-on magnifier lens is not aesthetically attractive.

BRIEF SUMMARY OF THE INVENTION

According to the present invention a replacement cover is provided for a wall mounted, circular thermostat. The replacement cover includes a lighting means and a transparent convex lens. The replacement cover is substituted for the original cover which is supplied with the existing circular thermostats. The replacement cover includes an annular circular portion which engages the rotatable sub-assembly of the thermostat. The replacement cover rotates with the rotatable sub-assembly. The replacement cover has a central transparent convex lens which serves to enlarge the view of the indicator readings of the thermostat. The replacement cover is aligned with the rotatable sub-assembly. The replacement cover has illuminating means, preferably an incandescent lamp bulb which can be activated to illuminate the indicator dials when the operator has a need to inspect them. In a preferred embodiment a battery means is contained within the replacement cover annular portion and is provided with conductors connecting the battery means to the lamp bulb. A normally open switch means is provided between the battery means and the lamp bulb. The switch means can be operated externally of the replacement cover, preferably by means of a switch button extending through an opening in the annular portion of the replacement cover.

BRIEF DESCRIPTION OF THE DRAWINGS

In FIG. 1 a conventional wall mounted, circular thermostat 10 is illustrated. Visible to an observe is a cover 11 including a central transparent portion 12 and annular circular opaque portion 13. The cover 11 is secured to a rotatable sub-assembly of the wall mounted thermostat 10 which includes temperature indications 14, 15 and pointers 16, 17. One of the pointers 16, 17 indicates the existing temperature in the region of the thermostat 10. The other pointer 17, 16 indicates the instantaneous thermostat setting.

The relatively small numerals appearing on the indications 14, 15 are displayed in the transparent portion 12 and are frequently difficult to read.

Figure 2:
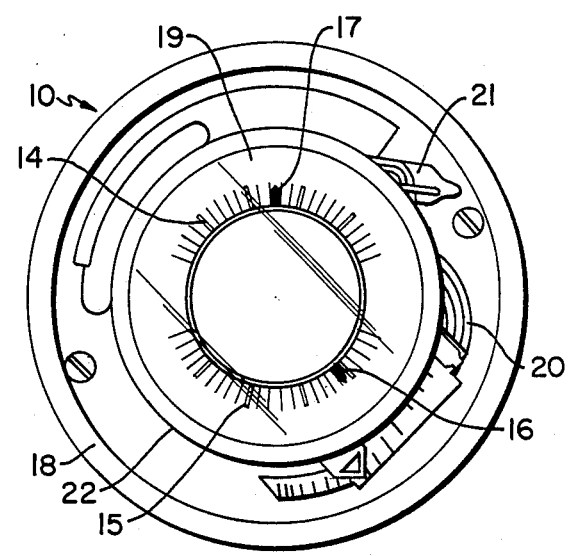
FIG. 2 is a front elevation of the thermostat of FIG. 1 with the original cover removed.
Figure 3:
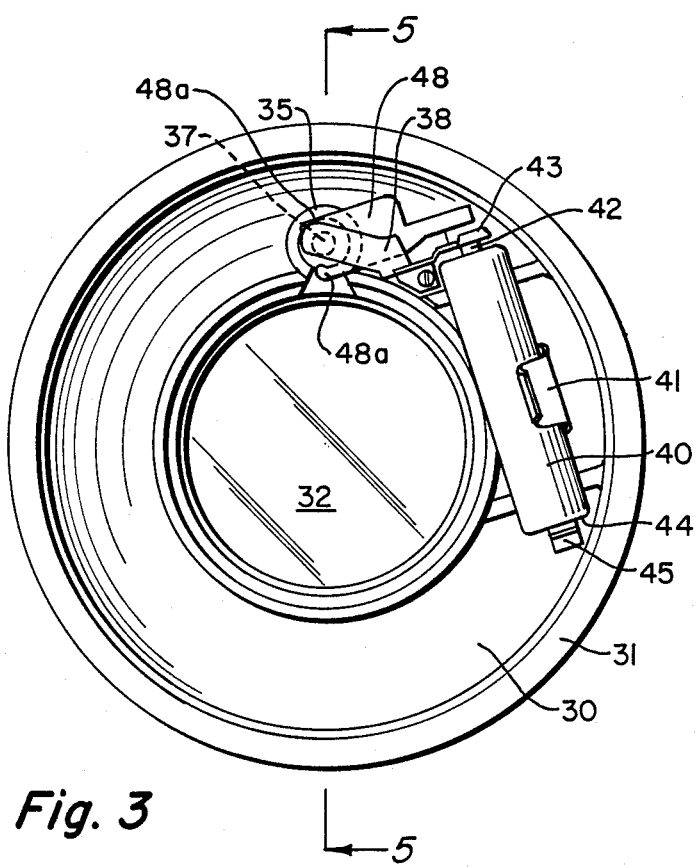
FIG. 3 is an inside plan view of a preferred replacement cover of this invention.
Figure 4:
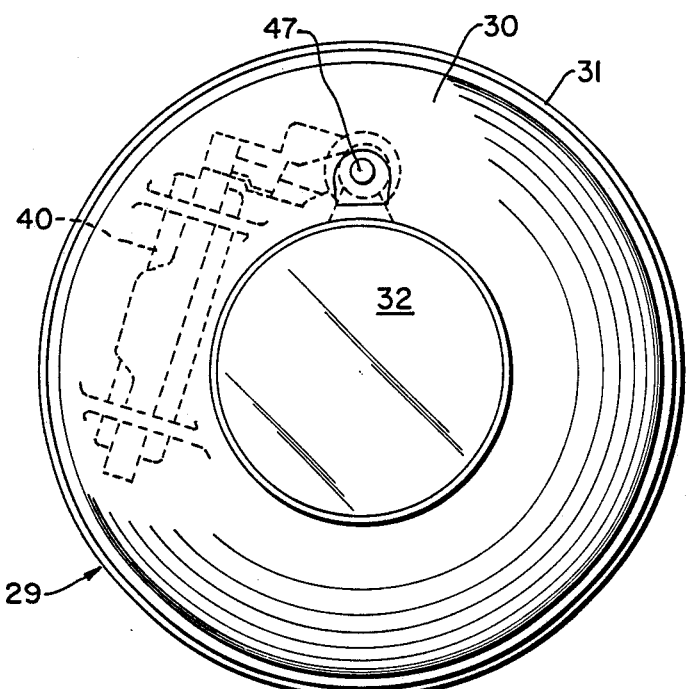
FIG. 4 is a plan view of the replacement cover of this invention with certain elements illustrated in phantom outline.
Figure 5:
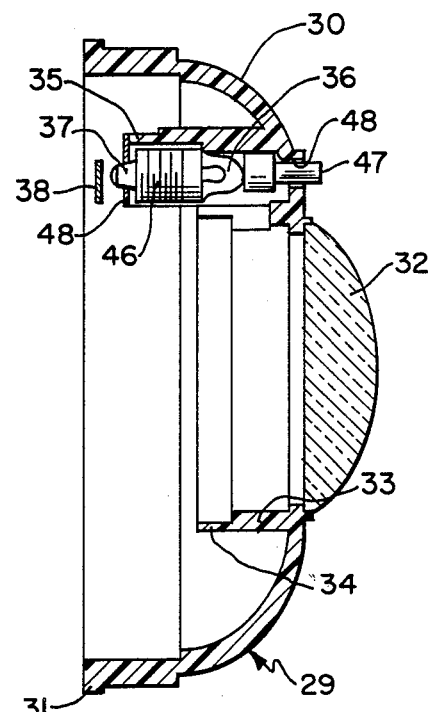
FIG. 5 is a cross-sectional view of the replacement cover of this invention taken along the line 5—5 of FIG. 3.
Figure 6:
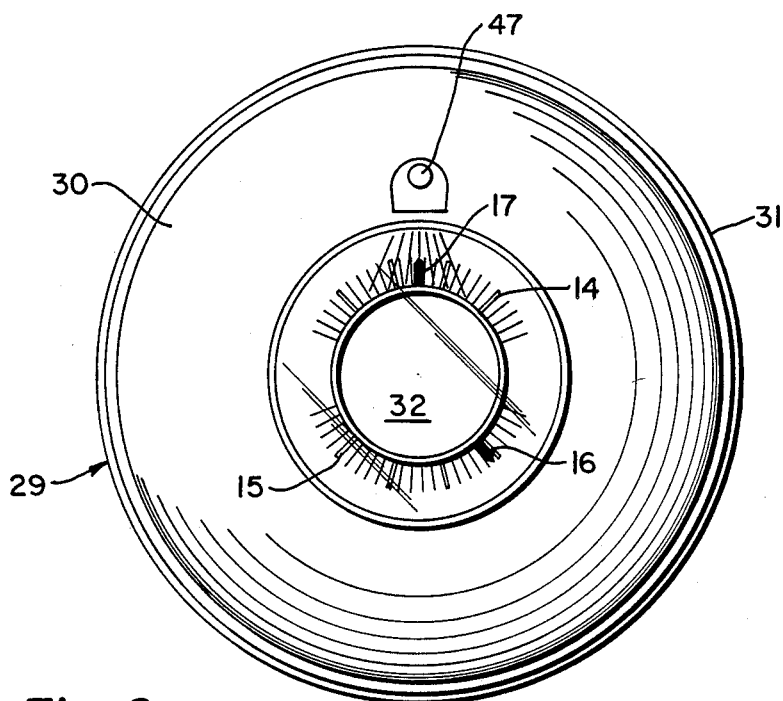
FIG. 6 is a front elevation view of the thermostat elements of FIG. 2 and the replacement cover of FIG. 4 secured in operating relationship.

According to the present invention, the coverplate 11 is removed to expose, as shown in FIG. 2, a wall mounted baseplate 18 and a rotatable sub-assembly 19 which normally includes temperature sensing coils 20, a mercury on/off switch 21 and the indications 14, 15 and pointers 16, 17. The temperature indications 14, 15 and pointers 16, 17 are contained within a circular dial housing 22.

The present replacement cover, shown in FIGS. 3, 4, 5 and 6, includes a circular annular portion 30 having rim 31 and a central transparent convex window 32. A tube-like inward projection 33 from the annular portion 30 has an inner rim 34 which is adapted to engage the central circular dial housing 22.

When the rim 34 is press-fitted over the circular dial container 22, the entire replacement cap 29 is secured to the rotatable sub-assembly 19. Thus the replaceable cover 29 becomes a part of the rotatable sub-assembly 19.

The transparent convex cover 32 functions as an enlarging lens to increase the visual presentation of the thermostat indications 14, 15.

Contained within the replaceable cover 29 in the annular portion between the tubular extension 33 and the rim 31 is an appropriate lamp socket 35 containing an incandescent lamp bulb 36. The lamp bulb 36 has a metal contact 37 which is normally spaced apart from an electrical conductor contact 38 which is mounted on the annular portion 31. A battery 40 is retained in a mounting clip 41 which is secured within the replacement cover annular portion 30. A positive electrode 42 of the battery 40 engages an electrically conducting contact 43, electrically connected to the electrical contact 38. The negative electrode 44 (casing) of the battery 40 engages a conductor 45, electrically connected to a spring strip 48 which has forked ends 48a to retain the lamp bulb 36 in the socket 35 by engaging the edges of the metal threads or cylindrical surface 46 of the lamp bulb 36. An electrical circuit between the battery 40 and the lamp bulb 36 is completed when the bulb 36 is advanced so that its metal contact 37 engages the electrical contact 38. Resilient means such as the spring strip 48 keep the metal contact 37 spaced apart from the electrical contact 38. The engagement is achieved by depressing a switch button 47 which is positioned within an opening 48 in the annular portion 30. The bulb is advanced to engagement of the metal contact 37 with the electrical contact 38 by flexing the spring strip 48 which is electrically engaged with the metal threads 46. It will be observed that the tubular extension 33 is cut away in the region of the lamp holder 35 to permit the lamp bulb 36 to illuminate the thermostat dial casing 22. When the replacement cover 29 is mounted on the rotatable sub-assembly 19, it is positioned so that the bulb 36 will be adjacent to one of the indications 14, 15.

The thermostat is set by rotating the replaceable cover 29 which also causes corresponding rotation of the rotatable sub-assembly. The lamp 36 retains a fixed relationship to the indicators 14, 15, regardless of the thermostat setting.

By combining illumination with optical magnification, the present invention improves the operability of existing wall mounted, circular thermostats without interfering with their normal and conventional operation.

Figure 1:
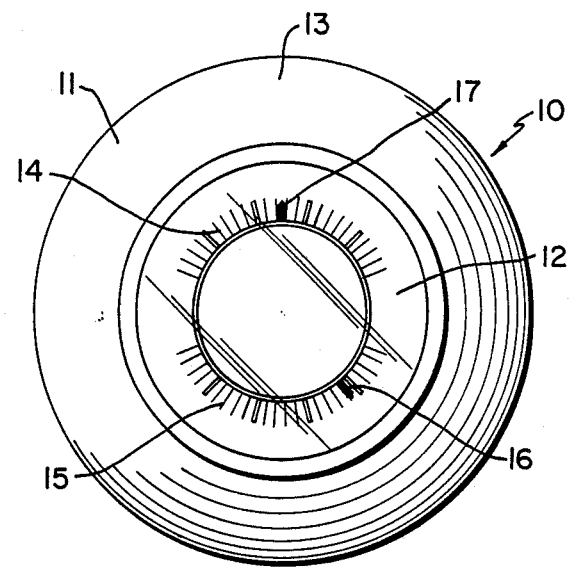
FIG. 1 is a front elevation view of a wall mounted, circular thermostat.

The present replaceable cover can be directly interchanged with the normal existing wall mounted, circular thermostat cover member (as shown in FIG. 1). The resulting appearance of the thermostat with the present replaceable cover is attractive. The present replacement cover should be substituted for a normal cover 11 at the time the thermostat 10 is produced and thus would be an original cover.

I claim:

1. A cover for use with a circular thermostat having a wall-mounted base and a rotatable sub-assembly, said rotatable sub-assembly having a central dial casing presenting temperature readings and/or settings;
    said cover having a circular annular portion and a central transparent portion and having:
    securing means for securing the cover to said rotatable sub-assembly of said thermostat;
    illuminating means beneath said annular portion for illuminating the said central dial casing;
    visual magnifying means comprising a transparent convex lens in said central transparent portion, said magnifying means being adapted to enlarge the view of said temperature readings and/or settings;
    and means for activating said illuminating means.

2. The cover of claim 1 wherein said securing means is a press-fit engagement of an inner surface of said cover with the rim of said central dial casing.

3. The cover of claim 1 wherein said illuminating means is an incandescent lamp bulb secured to said cover.

4. The cover of claim 3 including a battery means secured to said cover and having electrical conductors connected to said lamp bulb.

5. The cover of claim 3 wherein said means for activating said illuminating means is a normally open switch means having an operating button extending through an opening in the said cover; said switch means being adapted to close when said button is depressed toward said cover.

6. The cover of claim 3 wherein said lamp bulb is mounted on an inner surface of said annular portion so as to illuminate the said central dial casing in all positions of said cover.

7. The cover of claim 5 when said lamp bulb has a central electrical contact and a metal cylindrical surface and metal threads as a second electrical contact, said switch means including an electrical cover contact secured to the inner surface of said cover and the central contact of said lamp bulb which are normally spread apart; and said switch means further includes resilient means to maintain said central and cover contacts spaced apart.

8. The cover of claim 7 wherein said resilient means engages the metal cylindrical surface or threads of said lamp bulb.

* * * * *